United States Patent
Heffernan et al.

[11] Patent Number: 6,129,797
[45] Date of Patent: Oct. 10, 2000

[54] TIRE BALANCING

[75] Inventors: Michael Heffernan, Simcoe; Russell J. Freeman, Vittoria, both of Canada

[73] Assignee: M&R Tire Products Inc., Vittoria, Canada

[21] Appl. No.: 09/211,211

[22] Filed: Dec. 14, 1998

Related U.S. Application Data

[63] Continuation of application No. 08/977,335, Nov. 24, 1997, abandoned, which is a continuation-in-part of application No. 08/251,507, May 31, 1994, Pat. No. 5,766,501.

[51] Int. Cl.[7] .............................. F16F 15/36; G01M 1/30
[52] U.S. Cl. ...................... 156/75; 152/154.1; 156/110.1; 301/5.22
[58] Field of Search .................................... 156/75, 110.1; 152/154.1, 450, 504, 521; 301/5.22, 5.21

[56] References Cited

U.S. PATENT DOCUMENTS

| | | |
|---|---|---|
| 2,687,918 | 8/1954 | Bell et al. . |
| 2,909,389 | 10/1959 | Wilborn .................................. 301/5.22 |
| 3,230,999 | 1/1966 | Hicks . |
| 3,312,265 | 4/1967 | Turner et al. ............................ 152/450 |
| 3,747,660 | 7/1973 | Tibbals . |
| 3,913,980 | 10/1975 | Cobb, Jr. ................................. 301/5.22 |
| 4,109,549 | 8/1978 | Vincent . |
| 4,137,206 | 1/1979 | Kent . |
| 5,073,217 | 12/1991 | Fogal . |
| 5,083,596 | 1/1992 | Kato et al. . |

FOREIGN PATENT DOCUMENTS

| | | |
|---|---|---|
| 1570398 | 7/1980 | United Kingdom . |
| 2047736A | 12/1980 | United Kingdom . |
| 2074955A | 11/1981 | United Kingdom . |
| 95/00347 | 1/1995 | WIPO ................................. 152/154.1 |

*Primary Examiner*—Geoffrey L. Knable
*Attorney, Agent, or Firm*—McDonnell Boehnen Hulbert & Berghoff

[57] ABSTRACT

A method and composition of matter for balancing tire and rim assemblies of vehicles is disclosed wherein the composition of matter has rounded balancing elements of different size to line the interior of a tire casing and to move over the lining to offset points of imbalance.

12 Claims, 2 Drawing Sheets

TIRE BALANCING

The following is a continuation of U.S. patent application Ser. No. 08/977,335 filed Nov. 24, 1997, now abandoned, which is a continuation-in-part of U.S. patent application Ser. No. 08/251,507 filed May 31, 1994, now U.S. Pat. No. 5,766,501.

BACKGROUND AND SUMMARY OF THE INVENTION

This invention relates to an improvement in a method of balancing tires using a free flowing material within a tire casing and in the composition of said material.

Most tire and rim assemblies require balancing to prevent vibration within the vehicle while it is in motion. One currently popular, method of balancing tire and rim assemblies involves rotation of the assembly on a computerized balancing machine to determine the location and size of weights necessary to obtain balanced rotation. Lead weights of the determined size are then clamped to the assembly at the indicated points to complete the balancing procedure. There are other similar "fixed weight" systems know for tire balancing. Some disadvantages of this type of system are that tire balancing equipment in expensive, tire balancing requires a skilled operator and is time consuming, and tires must be rebalanced at regular intervals due to effects of varying tread wear.

Continuous self-balancing systems overcome many of the disadvantages of the above fixed weight systems. Continuous self balancing systems use the principle that free flowing materials contained in vessel in rotation will seek a distribution in the balance about the center of rotation and will tend to offset, by mass damping, any imbalance inherent in the vessel. The effectiveness of a dynamic balancing system is dependent in part on the ease with which balancing material can move within the vessel to positions, which offset points of imbalance.

In one application of this principle an annular ring is placed circumferentially about a rim and partially filled with heavy materials that will flow under the influence of centrifugal force. One such balancer uses mobile weights such as ball bearings, which are free to roll to any point on the ring. The effectiveness of this method is limited by the roundness of the ball bearings, the concentricity of the ring to the geometric axis and the inherent rolling resistance of the balls in the ring.

Liquids have been attempted in self-balancing systems to improve the mobility of the balancing material. U.S. Pat. No. 2,687,918 to Bell discloses an annular tube attached to a tire rim partially filled with mercury for continuous balancing of the tire and rim assembly. Several disadvantages exist for this method, the principal ones being high cost and toxicity of mercury, the difficulty of ensuring concentricity of the annular tube and the need for special rims.

The use of free flowing powdered materials in balancing compensators was taught in U.S. Pat. No. 4,109,549, in which an annular tube was filled with other dense materials such as powdered tungsten.

A different means for applying the self balancing principle was disclosed in U.S. Pat. No. 5,073,217 to Fogal. A free flowing balancing powder was placed directly within a pneumatic tire, instead of within a concentric annular tube. Pulverent polymeric/copolymeric synthetic plastic material in the range of 8–12 screen size and 40–200 screen size were disclosed. The patent taught that the powder within the tire would distribute within the tire under centrifugal forces to dampen vibration. Placing the balancing media within the tire has two primary advantages. The balancing force is positioned close to the point of imbalance and extraneous annular rings are not required. The disadvantage of Fogal is that powered products produced from a grinder or pulverizer tend to have particles with an irregular shape, which increases resistance or friction to fluidity. It is unlikely that heavy liquids, such as mercury, could be substituted advantageously in Fogal's application, however, both because of above mentioned safety reasons and because such liquids may be incompatible with or corrosive to the composition of a tire.

It is an object of the present invention to provide a method of tire balancing using an improved solid particulate material within a tire casing to obtain better fluidity for more efficient balancing of a tire and rim assembly.

The present invention uses the known principle of balancing through mass damping and the known method of using a solid materials within a pneumatic tire to obtain a dynamic balance while the wheel is in rotation. The improvement of this invention lies primarily in the composition of the mixture of the balancing material or media. A preferred size of this balancing media is in the approximate range of 10–50 mesh. The mixture can be comprised of a single media or a mixture of media. The mixture comprises small, dense bead and larger, less dense beads. Beads of a substantially rounded shaped reduce friction and improve the mobility of the material during balancing.

The small, dense beads may be formed of atomized metallic particles, which form during atomization as tiny balls. Corrosion resistant metal such as bronze, brass, zinc, tin, copper, stainless steel, nickel or silver or alloys of it may be used. Selection may be made after consideration of factors such as cost, availability and suitability for forming into small rounded shapes. In preferred embodiments the metallic component is selected from bronze, brass or zinc and atomized to form tiny balls, hereafter called "micro-spheres". The micro-spheres have round surfaces, which permit them to roll over each other with less friction than sharp edged particles. The metallic micro-spheres have the greatest density (about 5–9 gr/cm3) of the materials in the mixture so that they are urged to the outside of the other materials during rotation. The small size of the micro-spheres enables them to filter through the other materials during rotation. The interior circumference of a tire is usually riddled with small pockets and ridges produced during the tire molding process. These surface defects cause erratic movement of the balancing media and reduce its effectiveness. During rotation the micro-spheres are forced against the tire casing to fill in imperfections or voids on the tire wall to form a smooth lining which allows the remaining balancing media to move about the tire casing with less impediment. The excess of the micro-spheres, after voids and ridges are leveled, act as part of the balancing material and move to offset points of imbalance.

The larger, less dense beads are also rounded and may be formed from glass ceramics, alumina, corderite, porcelain or titanates and having a density in the range of 2–5 gr/cm$^3$. These beads function as the primary balancing material and form the largest portion by weight of the mixture. Glass spheres or beads of density 2–3 gr/cm3 are preferred. The glass beads are larger but less dense than the metallic micro-spheres. Thus the glass beads tend to ride over the metallic micro-spheres to move easily to points of imbalance to dampen vibrational energy. The glass beads are more durable than thermoplastic particles of Fogal and less prone to degradation. A preferred size range for these larger, less dense beads is 10–50 mesh.

The mixture may also include a partitioning agent, such as vermiculite, mica or other monoclinic non-reactive crystalline minerals, to separate and lubricate the mixture to enable all components of the mixture to maintain free-flowing characteristics. Vermiculite is preferred. Other partitioning agents may be used to reduce the friction of the balancing media, for example, a lubricant can be applied to the surface of the media. Such a friction reducing agent could include silicone that is sprayed or otherwise applied to the balancing media. Alternatively, the friction reducing agent may be applied to the interior of the tire such that it coats tire rim assembly. Other friction reducing agents, such as Teflon® or the like, may be used in lieu of, or in addition to, silicone.

A suitable desiccant, such as silica gel, A1203, CaC12 or CaS04 may be added to the mixture to prevent agglomeration in the presence of moisture. Silica Gel is preferred as a desiccant to maintain a dry atmosphere in the tire casing. The small particles used in this type of balancing system tend to be hydroscopic and may agglomerate in the presence of moisture. Agglomerated particles will cause a dramatic reduction in balancing efficiency. The silica gel tends to ameliorate this condition.

A preferred mixture of this invention is as follows.

| MATERIAL | SIZE | CONCENTRATION |
| --- | --- | --- |
| Non-ferrous atomized metal (e.g., bronze or brass) | 80–325 mesh | 10–25% |
| Glass beads (Lead free - soda lime type) | 20–50 mesh | 40–80% |
| Vermiculite | 20–325 mesh | 10–30% |
| Silica Gel | 20–40 mesh | 2–4% |

It has been found that this invention will work effectively with any conventional multi-wheel vehicle tire and rim assembly. It will be appreciated, however, that the amount of material to balance a particular assembly will vary in quantity and proportion, according to the type of assembly and the size of the tire and rim assembly. Correct amounts and proportions may be determined empirically by persons skilled having the benefit of this disclosure and the current state of the art. To illustrate in general terms, a steering tire of a truck (11×24.5) may require about 400 grams while a truck driving tire may require 500 grams of the mixture. Automobile tires may require only 160 grams of the mixture but are much more sensitive to vibration than truck tires and therefore require more vehicle specific and careful measuring.

BRIEF DESCRIPTION OF THE DRAWINGS

In the figures which illustrate a preferred embodiment of this invention.

DETAILED DESCRIPTION OF THE DRAWINGS

In the figures illustrating this invention like numerals indicate like elements.

Figure 1:
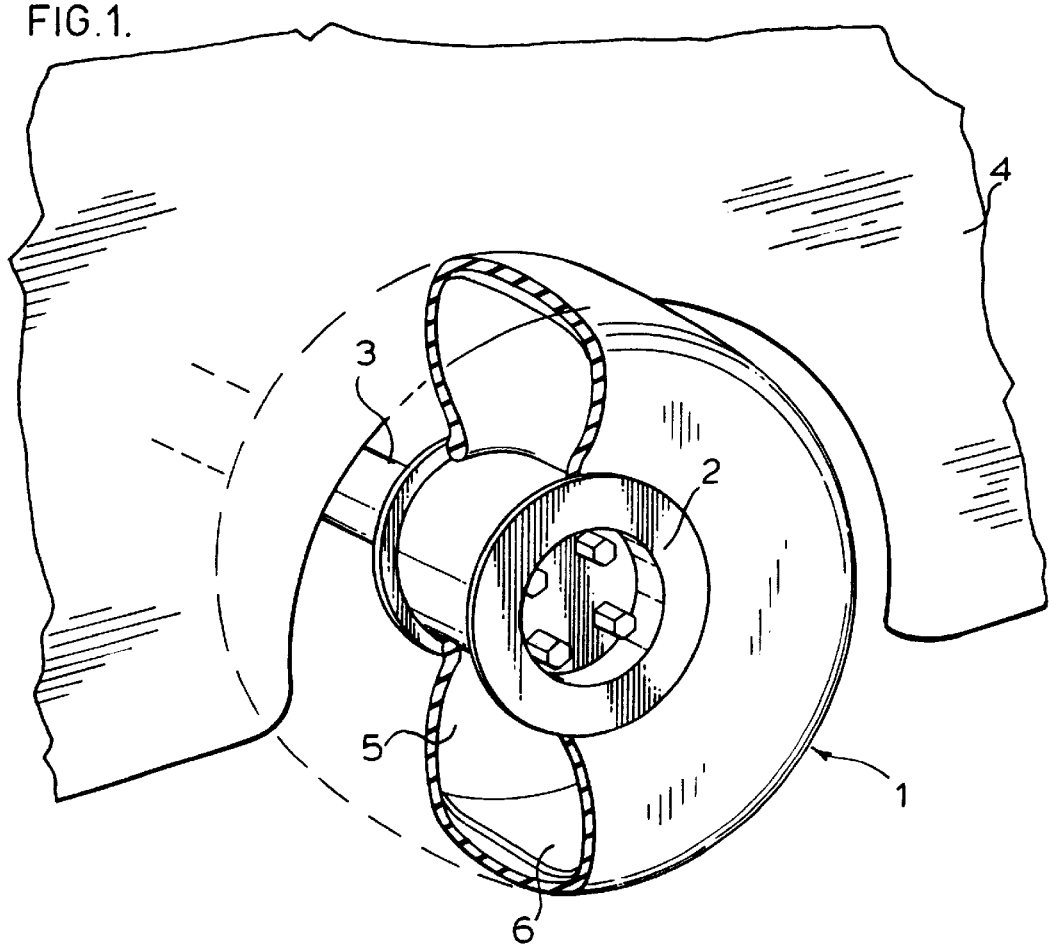
FIG. 1 is an illustration of a tire and rim assembly cut away to show the interior of the tire casing having the balancing material of this invention.

In FIG. 1, a tire (1) is shown mounted on a rim (2) which, in turn, is mounted on an axle (3) of a vehicle (4). The interior of the tire casing (5) is ordinarily filled with air. The balancing material (6) of this invention lies about the periphery of the tire case (5) while the wheel is in rotation by reason of the centrifugal force exerted on the material (6).

Figure 2:
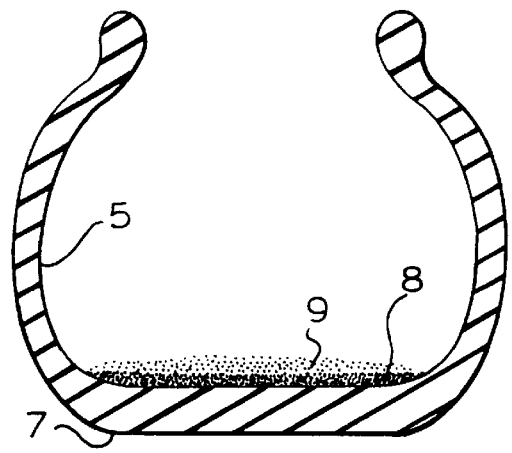
FIG. 2 is an illustration of a cross section of a tire and rim assembly showing the balancing material of this invention.

As illustrated in FIG. 2, the interior of the tire casing (5) has many voids and surface irregularities (7) (which are accenturated in the allustration).

The atomized metal micro-spheres (8) are shown to lie in and about the surface irregularities (7) of the tire casing (5). The micro-spheres (8) fill the voids and surface irregularities (7) and form a smooth, slippery surface for movement of the remainder of the balancing material. The excess of the micro-spheres acts as a balancing material. Glass beads (9) roll over the micro-spheres (8) and act as the primary balancing material. Vermiculite (not shown) and silica gel (not shown) are interspersed in the material to act as a lubricant and a desiccant, respectively.

The preferred proportions of the balancing mixture for use in truck tires is as follows:

| | |
| --- | --- |
| atomized metal | 17% |
| glass beads | 70% |
| vermiculite | 10% |
| silica gel | 3% |

For automobile tires, the preferred mixture is:

| | |
| --- | --- |
| micro-spheres | 24% |
| glass beads | 65% |
| vermiculite | 9% |
| silica gel | 2% |

In operation, the balancing mixture may be poured into a new tire casing as it is assembled onto a rim. In tire rim assemblies previously constructed, the sealing bead about the rim may be broken and the mixture poured into the tire casing. Alternatively the mixture may be poured into the valve stem or mixed with the air which pressurized the tire. Once a tire on a vehicle begins to rotate, the balancing material (6) distributes itself within the tire case (5). As the speed of rotation increases, the metallic micro-spheres (8) tend to filter to the outside adjacent the tire casing and to fill the voids and surface irregularities (7), thereby forming a smooth inner surface. The lighter and larger glass spheres (9) then roll over the micro-spheres to adjust to a position opposite a point of imbalance (10).

Figure 3:
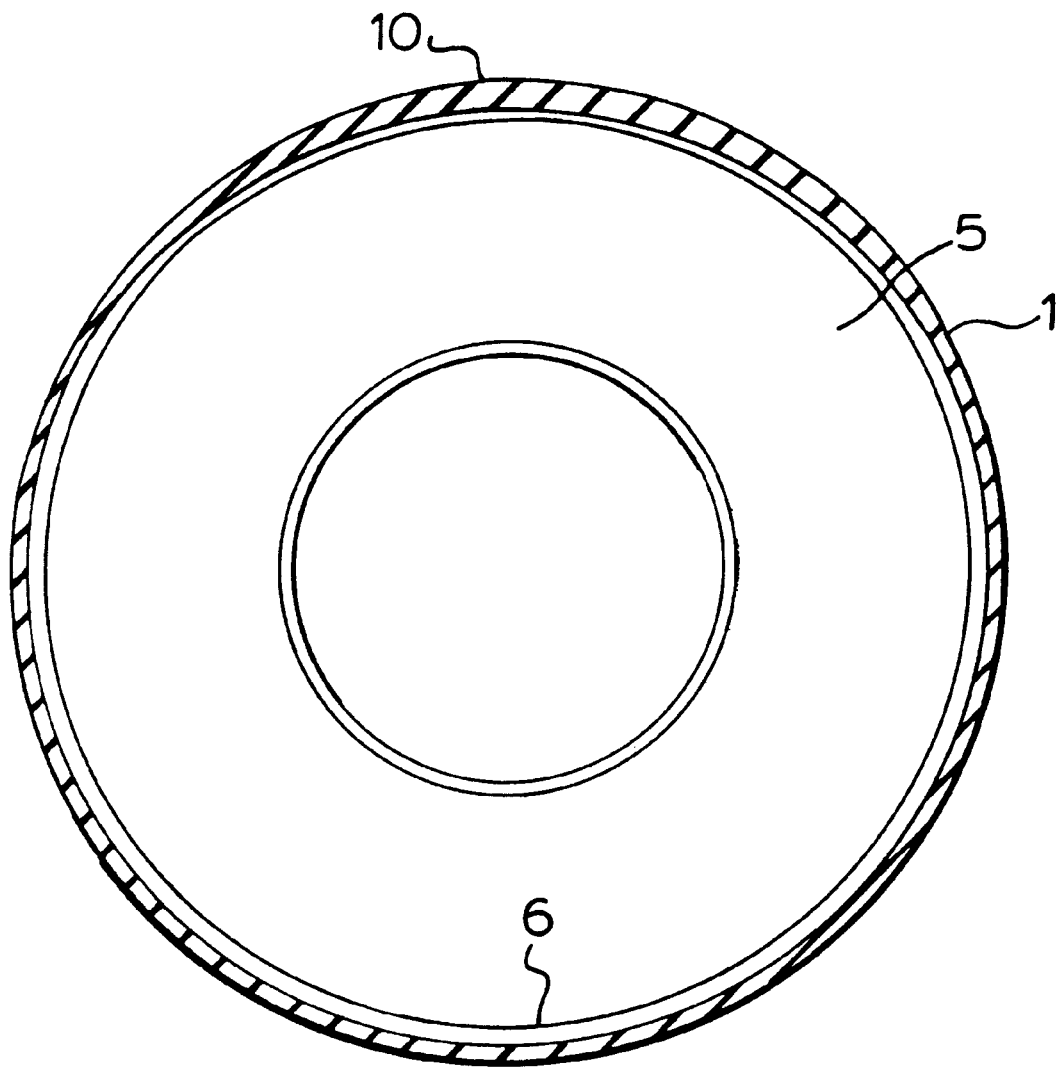
FIG. 3 is a side sectional view of a tire showing the distribution of the mixture of this invention.

As illustrated in FIG. 3, the material (6) distributes within the tire casing (5) so that a thicker portion of the material (6) lies opposite the point of imbalance (10), while some of the balancing material (6) is distributed about the entire inner surface of the tire casing (5). The distribution of the balancing material (6) acts as mass damping to overcome the eccentric force which would otherwise be introduced by the point of imbalance (10), so that the tire (1) turns smoothly.

We claim:

1. A method for continuous self balancing of a tire rim assembly during rotation comprising, in combination, the steps of, providing a tire rim assembly having a hollow tire casing surrounding the space about the rim defining an interior space and having a point of imbalance when the interior of the tire is pressurized with air;

adding a balancing media comprising solid spherically shaped particulate material selected from the group consisting of glass, ceramics, alumina, corderite, porcelain and titanates into the interior space of the tire casing before or during pressurization with air, the balancing media having a size of about 20–40 mesh;

rotating the tire rim assembly to distribute the balancing media within the tire casing; and continuously self-balancing the tire rim assembly by rotating the pressurized tire rim assembly and distributing the balance media within the tire casing so that a thicker portion of the balancing media lies opposite the point of imbalance.

2. The method according to claim 1 wherein the balancing media further comprises a desiccant to maintain a dry atmosphere within the tire casing pressurized with air.

3. The method according to claim 1 wherein the balancing media further comprises a partitioning agent reducing friction between the spherical solid particulate material and the tire casing.

4. The method according to claim 1 wherein the solid particulate material has a density of about 2–5 gr/cm$^3$.

5. The method according to claim 1 wherein the balancing media is added during pressurization of the tire rim assembly.

6. The method according to claim 1 wherein the balancing media is added during the assembly of the tire and rim.

7. The method according to claim 1, 2, 3, or 4 wherein the solid particulate material comprises glass beads.

8. A system for maintaining a rotating tire rim assembly in balance comprising:

a tire rim assembly having a hollow casing surrounding a space about the rim and having a point of imbalance when said space is pressurized with air; and a balancing media located in the interior of the tire casing, wherein the balancing media comprises a solid spherically shaped particulate material selected from the group consisting of glass, ceramics, alumina, corderite, porcelain and titanates, the balancing media having a size of about 20–40 mesh so that when the tire rim assembly is rotated the balancing media is distributed within the tire casing so that a thicker portion of the balancing media lies opposite the point of imbalance.

9. The system according to claim 8 wherein the balancing media further comprises a desiccant to maintain a dry atmosphere within the tire casing pressurized with air.

10. The system according to claim 8 wherein the balancing media further comprises a partitioning agent reducing friction between the spherical solid particulate material and the tire casing.

11. The system according to claim 8 wherein the solid particulate material has a density of about 2–5 gr/cm$^3$.

12. The system according to claims 8, 9, 10 or 11 wherein the solid particulate material spherical in shape comprises glass beads.

* * * * *